Dec. 15, 1953  E. W. HAWKINSON  2,662,244
RETREAD MOLD CONSTRUCTION
Filed Sept. 15, 1952
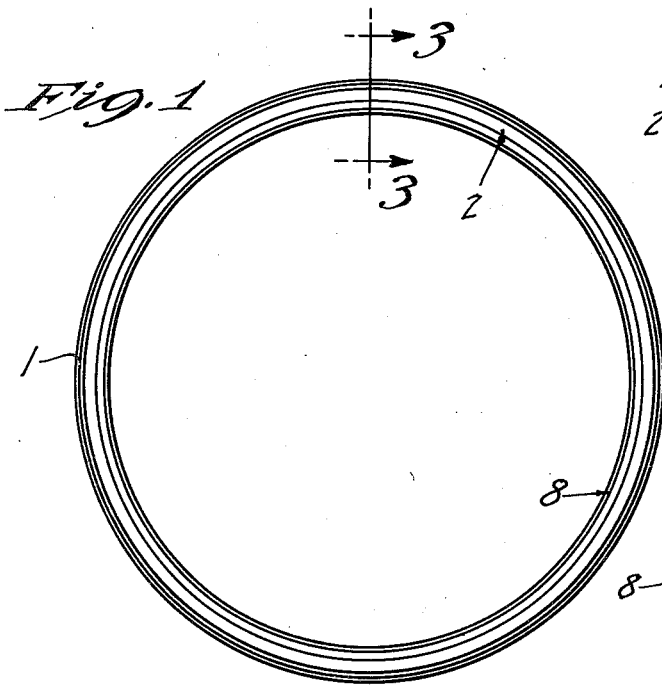
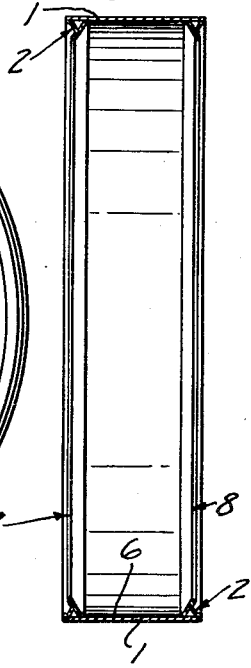
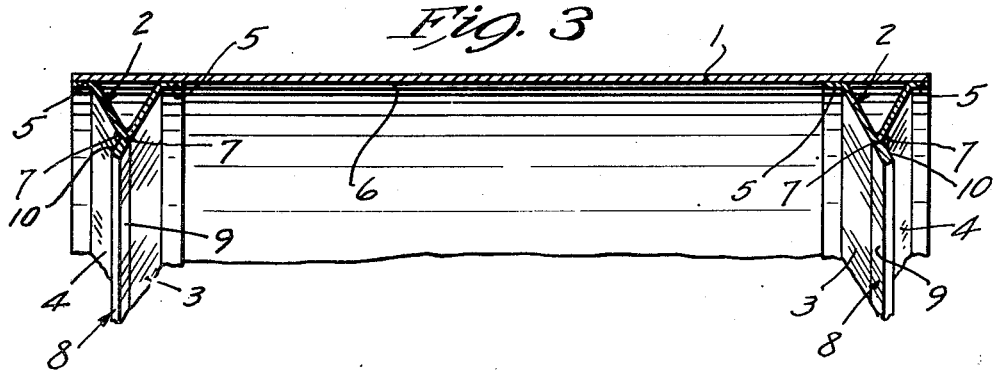
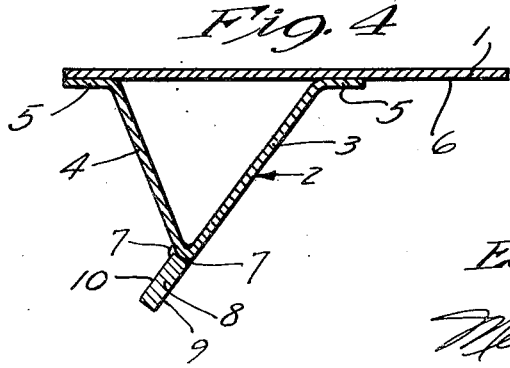
INVENTOR.
Earle W. Hawkinson
BY
Merchant & Merchant
ATTORNEYS Patented Dec. 15, 1953

2,662,244

UNITED STATES PATENT OFFICE 2,662,244

RETREAD MOLD CONSTRUCTION

Earle W. Hawkinson, Minneapolis, Minn., assignor to Paul E. Hawkinson Company, Minneapolis, Minn., a corporation of Minnesota Application September 15, 1952, Serial No. 309,619

2 Claims. (Cl. 18—18)

My invention relates to tire retreading molds, and more particularly to retreading molds of the type disclosed in Patent 2,331,680—known throughout the world by the trade designation "Hawkinson" treading equipment.

Such treading equipment is formed from endless cylindrical bands of sheet metal having continuous radially inwardly projecting tread material confining flanges at their opposite edges. These confining flanges are conventionally also formed from sheet material. In some cases it is found to be highly desirable to extend the confining flanges for a distance substantially greater than that shown in the above identified Hawkinson patent in order to prevent partial escape of the newly applied tread material (which turns fluid under heat and pressure) through the grooves normally provided between the lugs or other designs in the tread which extend below the shoulder. However, in view of the fact that the confining flanges are formed from sheet metal bent in generally V-shape I have found that there is a limit to the depth to which said flanges may be extended without weakening same. On the other hand, confining flanges formed from V-shaped sheet metal are highly desirable in view of cheapness to produce and their obvious lack of weight.

The primary object of my present invention is the provision of a model of the type above described which has sheet metal cross-sectionally V-shaped confining flanges which are extended beyond their point of possible weakness by means of a relatively rigid, strong and durable metallic ring.

A still further object of my invention is the provision of a mold of the type immediately above described which is inexpensive to produce, rugged in construction, and capable of producing a tread which is pleasing in appearance.

A still further object of my invention is the provision of a specifically novel confining flange extension means in the nature of cross-sectionally rectangular ring which is nestingly received within the confining flanges during the welding operation so that the inner walls of said rings are in the same planes as, and form inward extensions of, the radially inwardly diverging inner walls of said confining flanges.

The above and still further objects of my invention will become apparent from the following detailed specification, appended claims and attached drawings.

Referring to the drawings wherein like characters indicate like parts throughout the several views:

Fig. 1 is a view in side elevation of my novel device;

Fig. 2 is a vertical axial section of the structure of Fig. 1;

Fig. 3 is an enlarged fragmentary sectional view taken on the line 3—3 of Fig. 1; and Fig. 4 is a still further enlarged fragmentary section corresponding generally to Fig. 3.

Referring with greater particularity to the drawings, the numeral 1 indicates an endless cylindrical band formed from sheet metal and the like. Adjacent the opposite side edges of the band 1 are radially inwardly projecting confining flanges 2, also preferably formed from suitable sheet metal and bent in V-shape to provide radially inwardly diverging inner walls 3, outer wall 4, and anchoring skirts 5 which project in opposite direction and lie flat against the inner surface 6 of the band 1. Skirts 5 may be anchored to the band 1 by any suitable means such as spot-welding. Any suitable tread design forming elements may be secured to the inner surfaces 6 of band 1, such as shown by dotted lines in Patent 2,331,680. Again these design forming elements may be spot-welded to the surface 6 or secured thereto by nut-equipped bolts.

To effectively extend the confining flanges 2 beyond the point where they would normally be weakened by virtue of the depth of the V formed thereby, I secure by welding or the like, as indicated by numeral 7, cross-sectionally rectangular metallic rings 8 which are annular in shape. It will be noted that rings 8 have their inner surfaces 9 lying in the same plane as the inner walls 3 of the V-shaped confining flanges 2 so as to form generally radially inward extensions of said walls 3.

It will also be noted that the outer diameters of the rings 8 adjacent their outer walls 10 are slightly greater than the inner diameter of the V-shaped confining flanges 2; whereas, the external diameter of said rings 8 adjacent the inner walls 9 is slightly less than the internal diameter of said V-shaped confining flanges 2. This particular arrangement enables the rings 8 to be nestingly received within the confining flanges 2 when the band 1 is laid in a horizontal position. In other words, the rings 8—one at a time—will support themselves in position during the welding operation. This not only reduces the cost of construction but gives extremely excellent welding surfaces which increase the strength of the extended portion of the flanges formed by the rings 8.

Pneumatic tire casings are entered into and removed from any retreading band by the methods disclosed in the earlier Hawkinson patent (Re. 31,956).

While I have disclosed a commercial adaptation of my invention, it should be obvious that same is capable of some modification without departure from the scope of the invention as defined by the appended claims.

What I claim is:

1. In a device of the class described, a cylindrical sheet metal band, radially inwardly projecting continuous confining flanges adjacent opposite edges of said band, said confining flanges being formed from sheet metal bent in cross-sectionally V-shape and having their outer edges bent to form anchoring skirts which project in opposite directions and lie flat against the inner surface of said band, means securing said skirts to said band, and extension elements for said confining flanges, said elements comprising endless metallic rings welded to the crown of the V and extending generally radially inwardly therefrom.

2. The structure defined in claim 1 in which said metallic rings are rectangular in cross-section, the inner surfaces of each thereof lying substantially in the same plane as and forming extensions of the outwardly diverging inner walls of the V-shaped confining flanges, the external diameter of said rings adjacent the outer walls being slightly greater than the internal diameter of said confining flanges, and the inner diameter of said rings adjacent their inner walls being only slightly less than the internal diameter of said flanges whereby said rings may be nestingly received in said confining flanges during the welding operation.

EARLE W. HAWKINSON.

No references cited.